(12) United States Patent
Gozzi et al.

(10) Patent No.: US 7,848,836 B2
(45) Date of Patent: Dec. 7, 2010

(54) SCHEDULING SYSTEM AND WORK ORDER SCHEDULING PROTOCOL FOR SUCH A SYSTEM

(75) Inventors: Andrea Gozzi, Genova (IT); Massimo Paolucci, Genova (IT)

(73) Assignee: Siemens Aktiengesellschaft, Munich (DE)

( * ) Notice: Subject to any disclaimer, the term of this patent is extended or adjusted under 35 U.S.C. 154(b) by 864 days.

(21) Appl. No.: 11/666,114

(22) PCT Filed: Nov. 21, 2005

(86) PCT No.: PCT/EP2005/056113

§ 371 (c)(1),
(2), (4) Date: Apr. 24, 2007

(87) PCT Pub. No.: WO2006/053908

PCT Pub. Date: May 26, 2006

(65) Prior Publication Data

US 2008/0091289 A1 Apr. 17, 2008

(30) Foreign Application Priority Data

Nov. 19, 2004 (EP) ................... 04027527
Nov. 19, 2004 (EP) ................... 04027528

(51) Int. Cl.
*G06F 19/00* (2006.01)
*G05B 19/418* (2006.01)
*G06F 9/46* (2006.01)

(52) U.S. Cl. ............................ 700/100; 700/96; 700/97; 700/99; 700/102; 700/103; 705/8

(58) Field of Classification Search ............. 700/95–97, 700/99–103; 705/8
See application file for complete search history.

(56) References Cited

U.S. PATENT DOCUMENTS 5,099,431 A * 3/1992 Natarajan .................. 700/105

(Continued)

OTHER PUBLICATIONS

Bohnenberger et al.; Agents in manufacturing: online scheduling and production plant configuration; Agents Systems and Applications, 1999 and Third International Symposium on Mobile Agents. Proceedings. First International Symposium on Palm Springs, CA, USA, IEEE Comput. Soc, US, Oct. 3, 1999, pp. 66-73; XP-010358600; ISBN: 0-7695-0342-X The whole text.

(Continued)

*Primary Examiner*—Ramesh B Patel
(74) *Attorney, Agent, or Firm*—Laurence A. Greenberg; Werner H. Stemer; Ralph E. Locher

(57) ABSTRACT

In a scheduling system for planning and scheduling production in an industrial production system, which scheduled production is to be executed by the production system under control of a manufacturing execution system, the scheduling system is a multi-agent scheduling system. At least a part of the behavior of the agents in the multi-agent system is customizable by visually defined scheduling rules. The scheduling system and manufacturing execution system share a definition and execution environment having an editor that visually defines both the scheduling rules and control rules of the manufacturing execution system, and an execution engine for executing the scheduling rules and control rules and making scheduling decisions based on an execution of the scheduling rules and control rules.

20 Claims, 8 Drawing Sheets

U.S. PATENT DOCUMENTS

| | | | | |
|---|---|---|---|---|
| 5,148,370 | A * | 9/1992 | Litt et al. | 700/104 |
| 5,442,561 | A * | 8/1995 | Yoshizawa et al. | 700/100 |
| 5,487,144 | A | 1/1996 | Takahashi et al. | |
| 5,971,584 | A * | 10/1999 | Iriuchijima et al. | 700/101 |
| 6,128,588 | A * | 10/2000 | Chacon | 703/6 |
| 6,345,259 | B1 * | 2/2002 | Sandoval | 705/7 |
| 6,732,167 | B1 * | 5/2004 | Swartz et al. | 709/223 |
| 7,065,499 | B1 * | 6/2006 | Seth et al. | 705/26 |
| 2002/0174000 | A1 * | 11/2002 | Katz et al. | 705/7 |
| 2003/0220828 | A1 * | 11/2003 | Hwang et al. | 705/8 |
| 2004/0117227 | A1 * | 6/2004 | Wei | 705/7 |
| 2005/0154625 | A1 * | 7/2005 | Chua et al. | 705/7 |
| 2005/0278050 | A1 * | 12/2005 | Ruml et al. | 700/100 |

OTHER PUBLICATIONS

Djamila Ouelhadj: "a multi-agent system for the integrated dynamic scheduling of steel production" Thesis of the University of Nottingham, XX, XX, Aug. 2003 Complete 253, XP002321065 The whole text.

* cited by examiner

→ Decision Hierarchy
------- Negotiation-Collaboration

▊ Decision behaviour

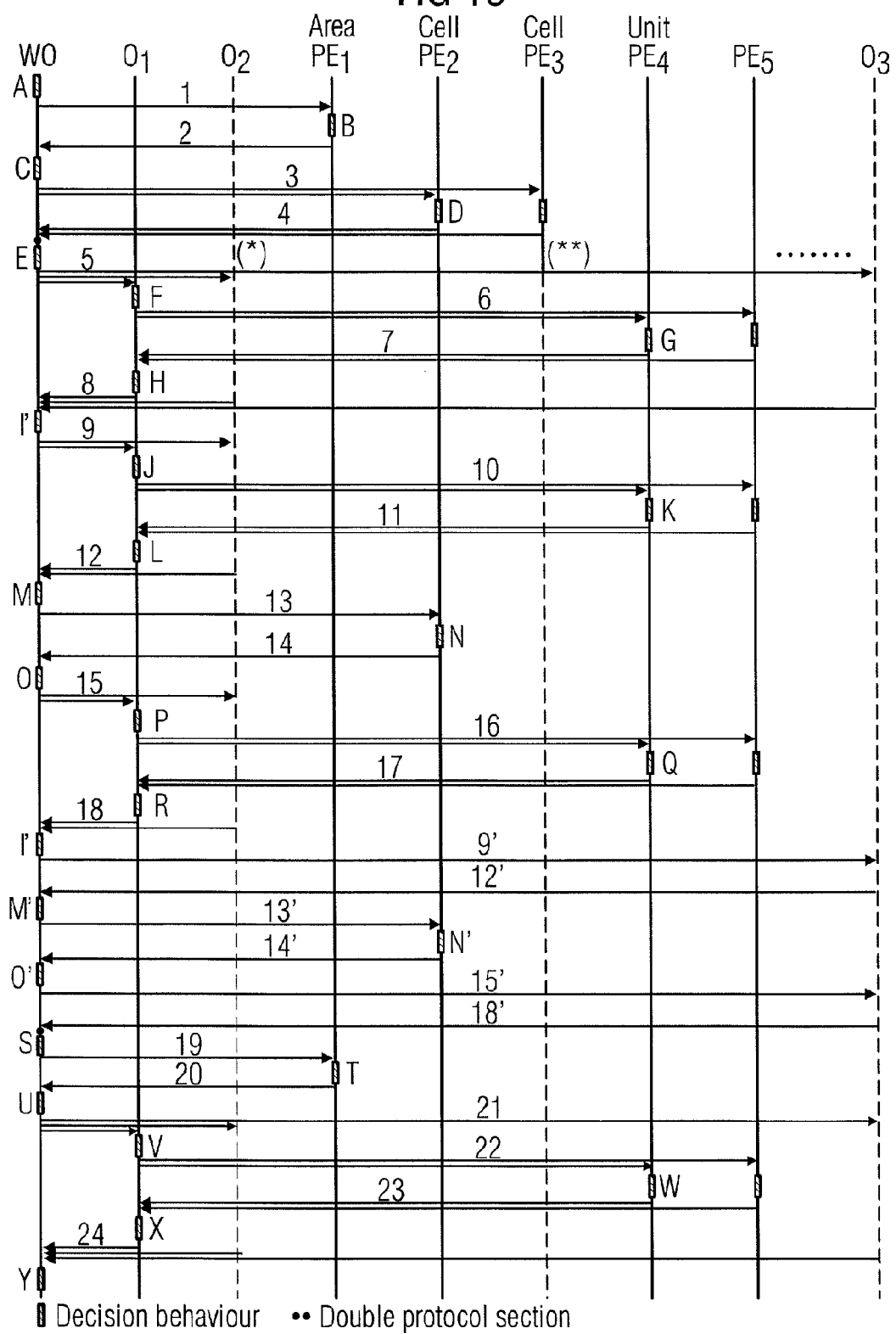

SCHEDULING SYSTEM AND WORK ORDER SCHEDULING PROTOCOL FOR SUCH A SYSTEM

BACKGROUND OF THE INVENTION

The invention relates to a scheduling system and a work order scheduling protocol for such an agent-based scheduling system.

Current production scheduling systems based on centralized and complex algorithms usually provide a pre-defined list of choices that permit to customize and tune their general-purpose behavior to the needs of a user, typically a company. Such prior art schedulers generally do not permit an easy definition of new criteria by the end users and/or taking into account new constraints.

In order to be truly effective, production scheduling systems must be reactive and highly configurable to adapt to different on-going manufacturing scenarios.

A second desirable feature implies the possibility of easily customizing the scheduling rules, by adapting them to different, changing constraints and objectives.

Known scheduling and manufacturing execution systems consider two decision makers, one for the scheduling activity and one for the manufacturing execution and control activity, that cooperate in a more or less tight way. This allows forecasting of problems in the plant (e.g. machine breakdowns, machine bottlenecks, etc.) and allows the scheduler to react for limiting such problems or to suggest modification of the plant layout/configuration. Such a process requires a number of iterations including scheduling decisions and plant controlling decision with reciprocal feedback before reaching a satisfying solution. However, the quality of solutions that these scheduling architectures can obtain are not satisfying due to the long interaction process they require and the impossibility of making a decision that lead straight to the optimal choice for both the plant configuration and the production schedule.

SUMMARY OF THE INVENTION

The object of the invention is to provide a solution that meets the above-mentioned needs in a fully satisfactory manner.

Accordingly, one aspect involves a scheduling system for planning and scheduling production in an industrial production system, which scheduled production is to be executed by the production system under control of a manufacturing execution system. The scheduling system is a multi-agent scheduling system, and at least a part of a behavior of agents in the multi-agent system is customizable by visually defined scheduling rules. The scheduling system and manufacturing execution system share a definition and execution environment having editor means for visually defining both the scheduling rules and control rules of the manufacturing execution system, and an execution engine for executing the scheduling rules and control rules and making scheduling decisions based on an execution of the scheduling rules and control rules.

Another aspect involves a work order scheduling protocol for an agent-based scheduling system for scheduling processing of incoming work orders in a plant by means of operations performed by physical entities available in the plant. Agents in the scheduling system have a tree-like hierarchy including branches. The protocol rules interactions between the agents in assigning operations requested by the incoming work orders to the physical entities. The protocol has a first main section, wherein the protocol identifies in the hierarchy a plurality of branches, each branch thus identified includes physical entities adapted to process a given work order. Further, the protocol has a second main section, wherein processing of the given work order is scheduled for each one of the identified branches of physical entities, whereby one of the scheduled branches is adapted to be selected for processing the given work order.

Preferred embodiments of the invention are specified in the remaining claims.

Contrary to the state of the art where scheduling decisions and control-execution decisions are made by different decisionmakers, the scheduling system according to the invention scheduler decisions and the control decisions are made by the same decision maker, in that the scheduler and control decisions are programmed and executed within a shared environment. The integration of the scheduling system according to the invention in the manufacturing execution and control system makes it possible to obtain information about production processes available in real time. Scheduling decisions are thus made in conjunction with controlling decisions with a direct feedback between scheduling actions and control actions.

The scheduling and controlling rules are modeled in a language comprising graphical or visual rules, which language is expressive for both scheduling and controlling contexts. Further, the scheduling decisions are made in a distributed and hierarchical way because control decisions are made in the same way in almost all real production plants. For that purpose, the scheduler is arranged in a distributed architecture by applying an agent-based approach and providing hierarchical decision-making by way of an agent interaction protocol. The scheduling system according to the invention is thus based on agents whose behaviors are customizable by visually defined rules, which are computed within a manufacturing execution and control system.

BRIEF DESCRIPTION OF THE SEVERAL VIEWS OF THE DRAWINGS

The invention will now be further described, by way of example only, with reference to the enclosed figures of drawing, wherein:

FIG. 13 shows an example useful to clarify the basic structure of the protocol by way of interactions among agents.

DETAILED DESCRIPTION OF PREFERRED EMBODIMENTS OF THE INVENTION

Figure 1:
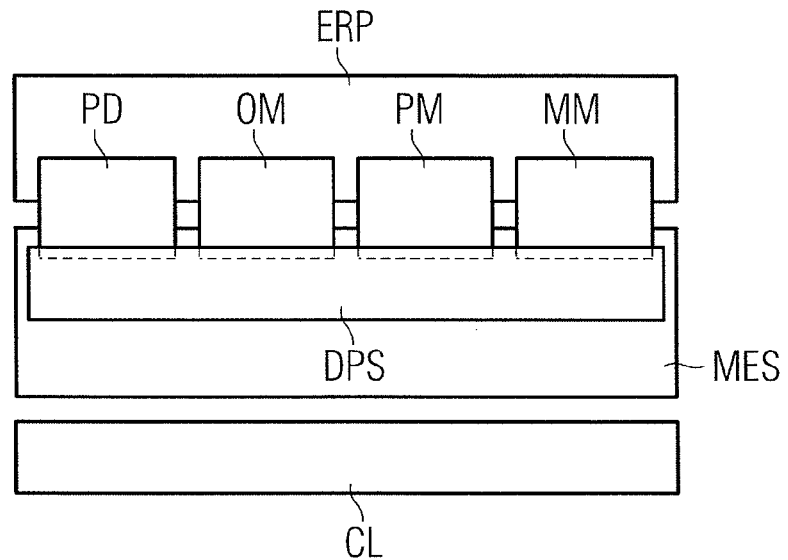
FIG. 1 is a functional block diagram representative of a typical manufacturing execution system and its related scenario of use.

FIG. 1 shows an exemplary functional architecture of a plant planning and control system. In the architecture shown, the various physical equipment in the plant (e.g. an industrial plant such as a chemical plant or a plant for manufacturing mechanical, electrical, and/or electronic products) and the associated control devices are generally represented by a control level CL. The control level CL is supervised by a manufacturing execution system MES that includes a detailed production scheduler DPS. The scheduler DPS receives input from an enterprise resource planning entity ERP via respective modules for product definition PD, order management OM, personnel management PM and material management MM.

Figure 2:
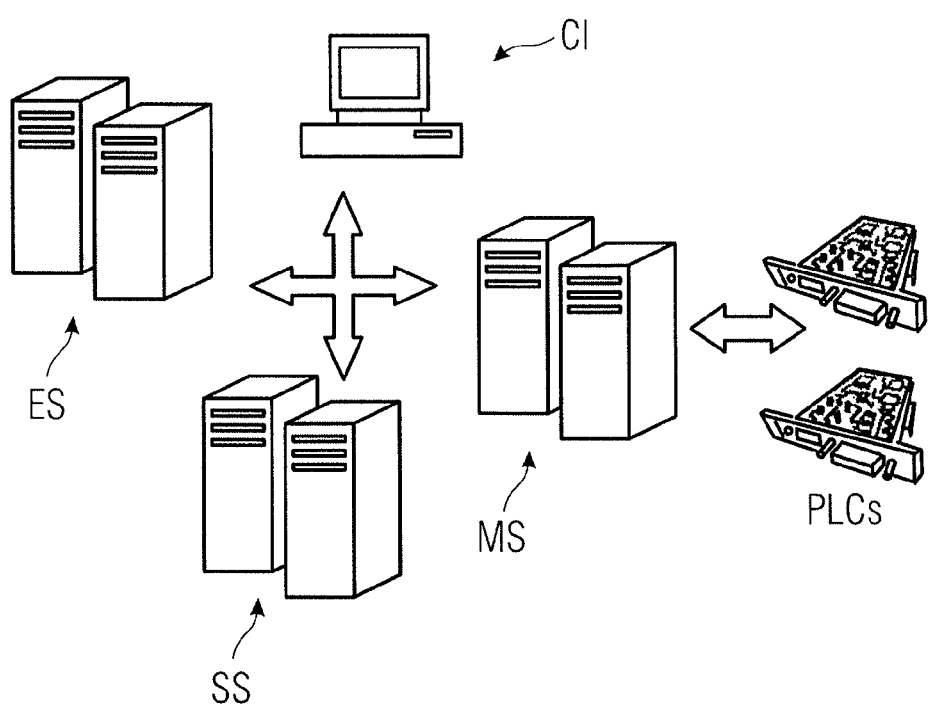
FIG. 2 is another block diagram showing a typical hardware layout supporting a manufacturing execution system.

FIG. 2 shows a possible hardware layout for server and client PCs executing all the computing capabilities of the system of FIG. 1 including the detailed production scheduler DPS. The shown hardware layout includes an ERP server ES, an MES server MS and a DPS server SS. The MES server MS cooperates with control level hardware represented e.g. by programmable logic control devices PLCs associated with the various equipment in the plant. Interfacing with a user is assured via a client interface CI comprised of e.g. one or more PCs for data input/output.

The exemplary embodiment of the invention described in the following refers, by way of example only, to a context wherein the need was felt of integrating an agent-based scheduler with a SIEMENS MES environment, such as the one commercially available under the name SIMATIC IT™, and specifically with a visual tool, designated SIMATIC IT™ Production Modeler, used to control plant operations in a fully graphical environment by way of visual rules.

It will thus be appreciated that the individual elements/components described herein, taken per se, are not new (which i.a. makes it unnecessary to provide a more detailed description herein), while their combination is new.

The key points that differentiate the arrangement described herein with respect to existing tools and software packages will now be briefly outlined by way of general introduction to a more detailed description.

The detailed production scheduler DPS is a fundamental component of the manufacturing execution system MES and the function provided by such a component is included in the ISA 95 (Industry Standard Architecture) standard. In this standard model both physical equipments and product descriptions are organized according to a hierarchical structure. Computing a detailed schedule usually must take into account decisions, as resource assignment, relevant to different levels; additionally, it must satisfy constraints and meet objectives that are specific for each node in the model hierarchy.

Changes may occur that locally modify such constraints and objectives. A flexible scheduling system for use in manufacturing must therefore be able to adapt to the distributed structure considered in the foregoing, while respecting the relationships among physical elements in the hierarchy. In a scheduling system compliant with the ISA 95 model the scheduling decisions must satisfy the local constraints, while reaching as much as possible the local objectives or finding an acceptable compromise among them. As a consequence, a truly satisfactory scheduling system cannot be a comprehensive centralized component; on the contrary, it must be easily reconfigurable, also in terms of constraints and objectives, with the capability of mapping the possible changes in the physical manufacturing system (i.e., in the equipment and products). This is achieved by an agent-based scheduling system.

In order to allow the behavior of the agents of the agent system to be easily modified by end users to and adapt it to specific customer's requirements, the engine controlling the agent system evolution is separated from the agent behavior, as this latter is defined by a set of rules. These are not set, nor triggered in the engine but in an external graphical environment, specifically in the SIMATIC IT™ Production Modeler.

A simple visual tool such as the aforementioned SIMATIC IT™ Production Modeler can be extended to the purpose of interfacing the kernel of the agent engine, and this fact allows the customization described above for the end user. Those of skill in the art will promptly appreciate that, while the SIMATIC IT™ Production Modeler tool is being considered here as a direct reference, any other different visual environment with an appropriate execution system could be used in the place of the Production Modeler tool.

The integration of an agent-based scheduler with a plant control system (e.g. the SIMATIC IT™ MES) obtained through the visual rule definition environment (e.g. the SIMATIC IT™ Production Modeler tool) can be rendered very tight. The scheduling rules can in fact share data and methods with the plant control rules, thus making the scheduling agents aware of the actual state of the equipment they are associated with.

The exemplary agent-based scheduling system described in the following is a multi-agent system for scheduling essentially comprised of two parts:

- a static structure defining the classes of agents in the system, and
- a set of multi-agent system activities, defining the behaviors of the individual agents and the interaction protocols among agents (who makes decisions?, when?, etc.).

Figure 3:
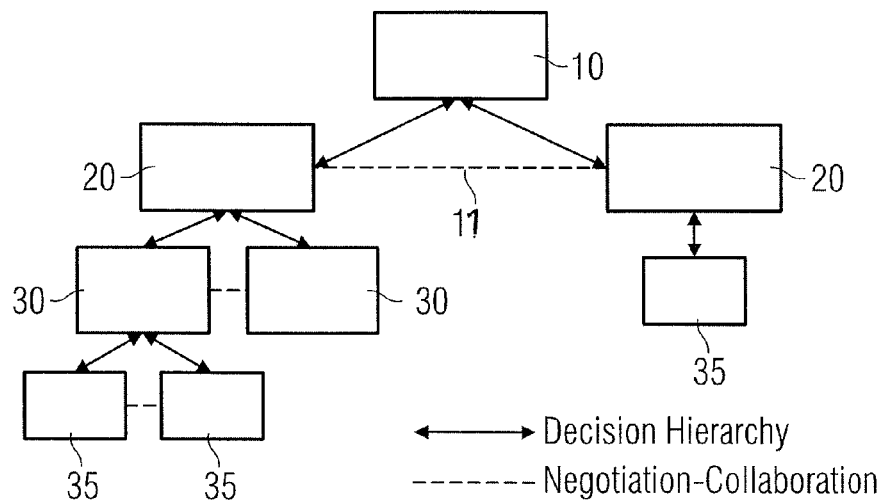
FIG. 3 shows an example of hierarchical structure of agent entities as used in the arrangement described herein.

Agents in such a scheduler can be structured in a hierarchy as shown, for example, in FIG. 3 wherein reference number 10 designates an agent site while agent areas are indicated by 20. A set of agent cells 30 are connected with respective agent areas 20. Reference number 35 designates an agent unit.

Double arrows represent the decision hierarchy, while the dashed line 11 indicates negotiation or collaboration processes between the agent entities (e.g. agent areas 20).

Typically, agents in such a scheduler are associated with:
- physical assets (site, area, cell, unit);
- information (e.g. production schedule, production capability);
- functions (e.g. scheduling, inventory control, maintenance management); and
- scheduling decision activities (e.g. scheduling progress tracking, manual schedule).

Additionally, different behaviors are applied in different agent classes, and common behaviors are represented e.g. by the following operations:
- asking other agents for services (e.g. task execution in a time-slot, use of a limited resource) or information (e.g. end-date of a task);
- replying to requests for service by trying to offer the best service according to given criteria while satisfying constraints; and
- synchronizing with other agents' activity (e.g. wait for an intermediate product agent scheduling decision).

The scheduling decisions are defined by way of the negotiation protocol 11 which establishes the interaction rules among the agents. This arrangement will be described in greater detail below by reference to FIGS. 5 to 13. The protocol 11 is coded within the agent behaviors and can be used as a basic scheduling mechanism for any production plant.

A mechanism suitable for adapting such a basic scheduling protocol to a specific manufacturing environment involves customizing at least a part of the agent behavior by way of visually defined rules. The visual scheduling rule definition language necessary for that purpose is based on a reduced set of graphical items providing the end user with a way to customize the scheduler activity. The graphically defined scheduling rules can represent scheduling constraints, scheduling criteria or interactions between scheduling and production control activities. Allowing the definition of scheduling rules renders the agent-based scheduler effectively customizable for different production scenarios. The user of the manufacturing execution system can thus model his own scheduling rules for the plant using an implementation of the visual language consisting of an editor and of a rule execution engine.

The visual language considered herein is characterized by elements (i.e. blocks or modules) for:
- real time acquisition to permit integration with a Manufacturing Execution System environment; the purpose of these blocks is to permit the definition of the rules to detect the occurrence of events;
- output of data to external destinations;
- function calls (e.g. for the computation of jobs completion time);
- storing local data within the rule scope;
- conditional statements (e.g.: if-then-else);
- providing entry points for sub-rules invocation; and
- providing graphical links (arrows) connecting blocks and defining the rule computation flow.

Figure 4:
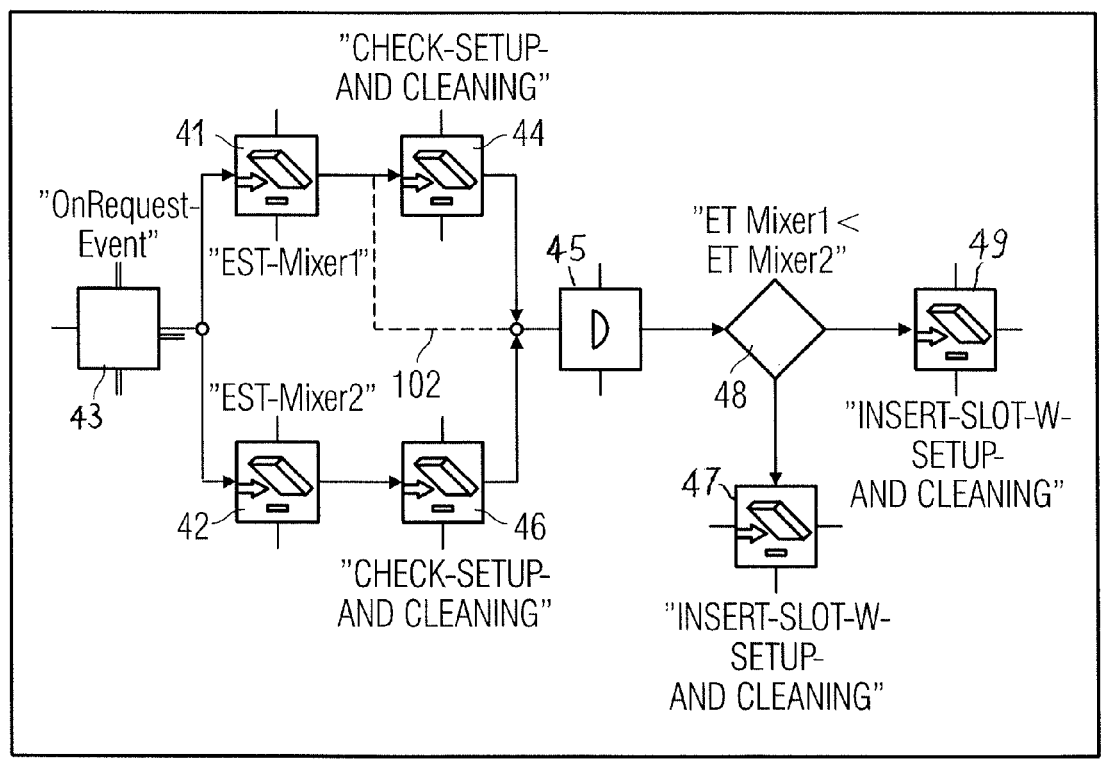
FIG. 4 shows an example of a specific implementation of the arrangement described herein.

An example of a rule that is defined visually and customizes a scheduling agent behavior is presented in FIG. 4. Specifically, FIG. 4 is exemplary of an image that can be displayed on a screen of e.g. a computer such as a PC serving as the client interface CI shown in FIG. 2.

The rule shown in FIG. 4 is associated with an agent that models a production cell composed of two equivalent units 41 and 42. The rule is invoked whenever an operation has to be assigned to the related equipment, by way of an on-request event block 43.

In the example shown, the rule executes the steps described in the following.

The rule accesses the data from the scheduling system and retrieves the earliest feasible starting time for executing the operation on both the two available units 41 and 42.

Then a check for setup or cleaning requirement, 44 and 46, is performed on both units 41 and 42, respectively.

Once the two parallel execution flows in the rule have been completed and the results stored in a step 45, the rule executes a conditional statement 48 looking for the unit providing the earliest processing slot for the operations.

According to the selected rule branch the chosen unit is assigned by evolving towards either of the steps 47 or 49.

The dashed line 102 is exemplary of the possibility, offered to the user, of e.g. "shortcutting" the step 44, for instance for indicating the unavailability of the related function. Effecting such changes/modifications within the framework of a typical interactive environment is a feature available in visual tools as considered herein.

Scheduling rules defined by way of the graphical editor define custom actions in taking decisions for scheduling purpose.

An exemplary basic scheduling rule is the following: The scheduler recognizes that two or more machines are available for processing a particular task. The scheduler raises an event in order to ask the custom implementation for deciding which machine has to be selected. The scheduling rule evaluates a set of data (even data provided by the scheduler itself) and signals the scheduler with the customized decision.

As the scheduling rules and control rules are defined and executed in the same visual environment, scheduling rules can interact with the control level and influence it in order to perform a better production plan. For example, a scheduling rule can modify a machine working speed in order to guarantee a task deadline is not missed.

Another exemplary manner of applying scheduling rules is to monitor the status of a machine/equipment that is considered critical for scheduling purposes and taking, consequently, decisions. For instance, if a breakdown occurs in a machine being monitored, the system, by executing a scheduling rule, can issue an alarm signal and/or possibly rearrange automatically the schedule by excluding that machine/equipment from the scheduling process, while involving in the process all the other equivalent machines available in the plant to perform the operation.

The arrangement as described up to here produces a number of basic advantages when applied to a scheduler and a manufacturing execution system, namely:
- an essential simplicity in customizing the scheduling behavior via graphical rules;
- the possibility of setting up "libraries" of scheduling rules on a by-industry basis;
- the possibility of re-using previously defined graphical rules in order to adapt the behavior of the rules to the requirements of a plant being supervised;
- the scheduler ability to react in real-time to external events.

Figure 5:
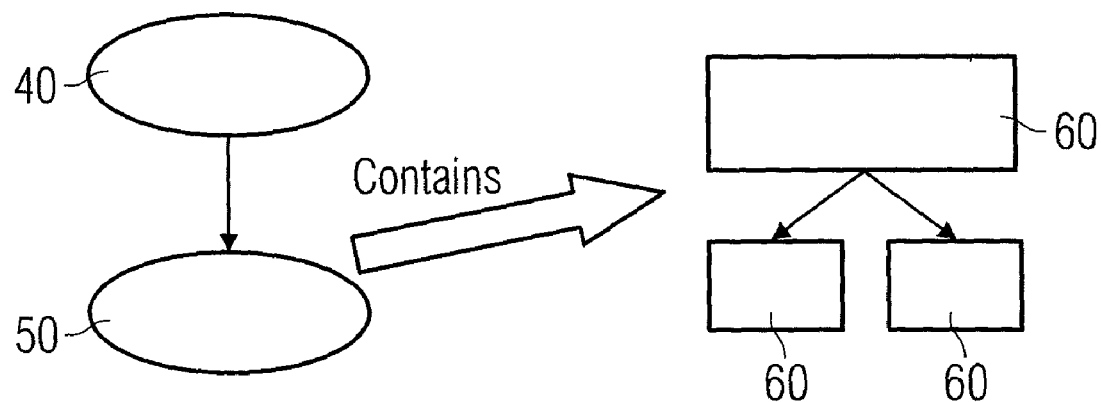
FIG. 5 shows a work order—product segment relationship in an arrangement as described herein.

As schematically shown in FIG. 5, a production schedule is essentially a list of work orders (WO) 40 to be scheduled with details. Each of these orders in turn contains a product 50 defined in the form a set of product/process segments 60 generally arranged in a hierarchy.

Figure 6:
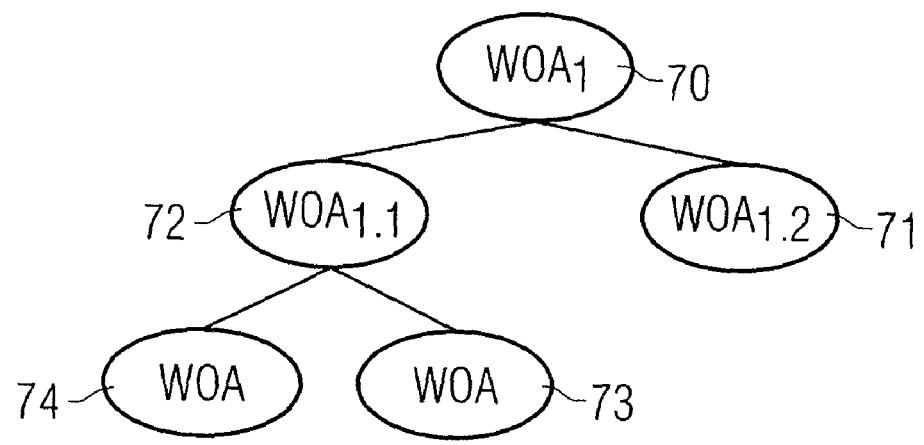
FIG. 6 shows example of work order agents in an arrangement as described herein.

All these entities are related to logical agents. Not all the agents are always active in the system. For instance, physical agents (PAs), related to physical entities, are active whilst the associated entity is part of the plant. Work order agents (WOAs), as exemplified by blocks 70 to 74 in FIG. 6, are created and activated in response to a new work order arrived in the system. Process and product segments agents (ProdSA, ProcSA) are activated by the work order agents; these work out the list of operations to be performed for serving the work order and create necessary operation agents (OAs) related to operations that are necessary to process the work order.

A major portion of a multi-agent system activity is related to assigning operations requested by work orders on the physical entities available in the plant, taking into account scheduling constraints and criteria. This is the fundamental capability of the scheduler and it is performed by applying a work order scheduling protocol.

However, other interaction protocols among agents exist in an Agent-based Detailed Production Scheduler, and provide useful capabilities to the product.

For example, a dedicated interaction protocol is applied by work order agents in order to "browse" the plant structure and select the physical entity to contact for acquiring a given service. Other protocols can be used to rearrange slot allocation of an earlier computed schedule and optimize performance.

The work order scheduling protocol thus plays quite a significant role in the exemplary scheduling system described herein. The protocol specification and some examples of communications based on that protocol will therefore be given in the following.

The scheduler described herein will be assumed to be operating in real-time, with the multi-agent system always active.

While the agents operate autonomously and concurrently and the multi-agent system may be involved at each time instant in several decision steps for scheduling one or more work orders, the description of the multi-agent system activity can be given following the action steps for scheduling a single work order. This activity contains all the actions performed by the multi-agent system and provides a complete overview of the multi-agent system while applying the work order scheduling protocol.

Essentially, a work order agent (WOA) is created in response to a new work order to be scheduled. The work order agent (WOA) contains all the data describing the work order (product type, quantity, due-date, lot number, etc.). The work order agent activates the product segment agents (ProdSA) and hence the process segment agents (ProcSA) related to the work order product.

By accessing the necessary information from the process segment agents, the product segment agents become knowledgeable of the list of operations to be performed for producing the given product.

The product segment agents (ProdSA) create operation agents (OA) in a number equal to the number of the necessary operations. Each work order agent (WOA) knows the operation to be performed and the resources necessary for the operation. Moreover, the work order agent (WOAs) are provided by the product segment agents (ProdSAs) with the product segment constraints and dependencies as priority, parallel execution infeasibility etc.

Some process segments may in fact require resources defined at levels higher than the unit level (e.g. cell or area); this information is preserved by the product segment agents. These agents are in charge of contacting the right physical entity by applying the negotiation protocol as described in the following.

According to the ISA 95 specification, process segments, and hence product segments are organized in a hierarchical structure. Therefore, a product segment can be composed of subsegments; the agents representing the product segments reflect this structure. However, agents modelling product segments do not operate in hierarchical structure, but rather represent how the various segments are linked to each other.

Figure 7:
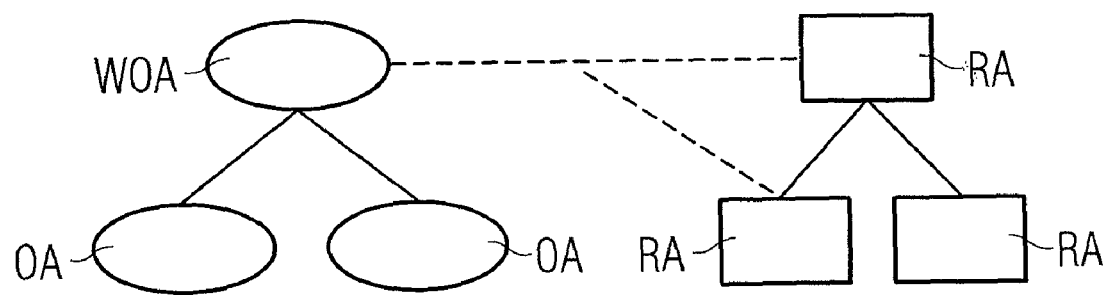
FIG. 7 shows work order agents and physical entity interaction in an arrangement as described herein.

FIG. 7 schematically shows the creation and interaction between work order agents WOAs and operation agents OAs (solid line) and possible interaction messages between WOAs (or OAs) and resource agents RAs (dashed line).

The protocol described herein defines the fundamental interaction among agents for the agent-based detailed scheduler. The work order scheduling protocol is applied by each work order agent for interacting with physical entity agents and assigning a processing resource and time slot for each operation that is part of the related work order.

The exemplary protocol described herein is designed for a flat product segment structure. This means that product segments are assumed containing a list of atomic operations. Product segments do not contain sub-segments.

The exemplary protocol described herein is composed by two main sections plus initialization and finishing sections.

The first section can activate new instances of the section itself, providing recursive actions; the second section of the protocol includes a set of steps executed iteratively.

The following protocol description provides details for each protocol section and for the agent behaviours that manage the conversation. The description is split up in the various sections of the protocol.

During the initializing conversation, the work order agents are in charge of acquiring resources for processing their own operations. The work order agents are activated one at a time, in response to a new incoming order to the system. Otherwise, the work order agents are activated in batch if a detailed schedule is computed on the basis of a rough production schedule or the scheduling process is activated intermittently.

Before starting a scheduling conversation, each work order agent takes a set of decisions, including computing priorities for the work order, choosing dependency and checking criteria (backward or forward) and possibly selecting the physical entity to contact for sending the first message.

Applying the negotiation protocol, the product segment agents select the physical entity to contact for starting the protocol according to the rules indicated in the following:

the physical entity to contact is the lowest level entity able to perform all the activities listed in the related product segments; and if more than one entity at the same level are available, then the "parent" entity is selected.

These entity selection rules ensure that the product segment is executed on the "optimal" available resource and avoid spreading operations of the same segment among equivalent high-level entities (area, cell) when this is not strictly necessary.

When a work order agent wants to start a work order scheduling conversation, it applies the first section of the protocol. The first section described in detail in the following comprises two steps.

Figure 8:
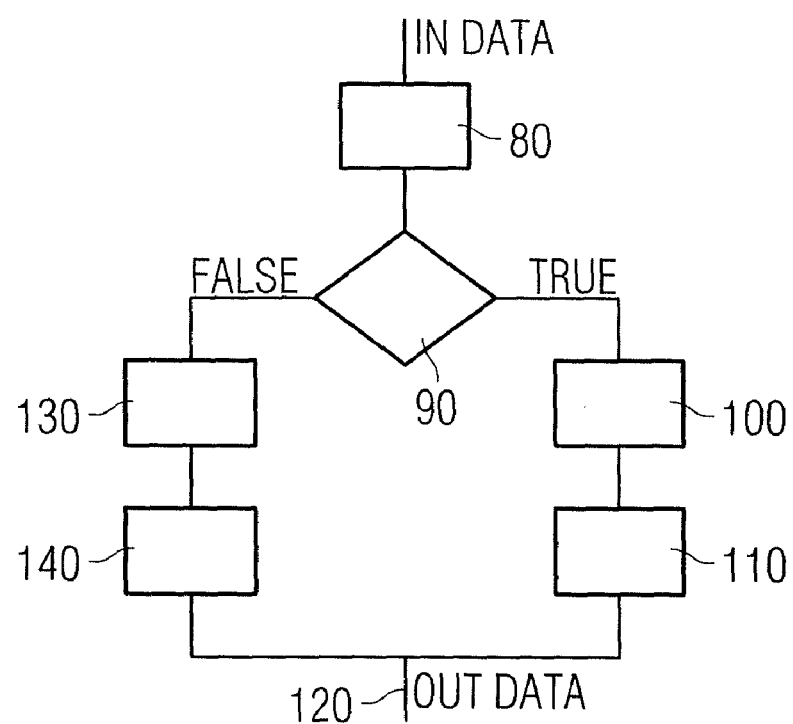
FIG. 8 shows a flowchart for a first section in a protocol as described herein.

First Section "Requesting Work Order Service":

Step 1:

In FIG. 8, the Section 1 of the work order scheduling protocol is defined by way of a flow diagram; it includes evaluation steps, sub-routine call steps and conditional statements.

Referring to FIG. 8, in a step 80 a work order agent sends a request_wo_service message to the physical entity agent (PEA). The contacted physical entity agent has been selected by the work order agent according to the rules given above or indicated by a previous protocol section if the actual section is nested in a previous section.

A step 90 is devoted to verifying if the resource agent RA has signaled a delegation. In the positive, in a step 100 the list of RAs to contact for nested first section is the RAlist. In a step 110 for each $RA_i$ in the RAlist the first section is called on the $RA_i$.

In the negative, in a step 130 the list of RAs to contact for each operation is OAmap. In a step 140 for each $RA_i$ in the OAmap the second section is called.

A request_wo_service message declares the request for service; it contains the information about the required operations (work order product segment), the amount of workload and additional data that could be used by the agent behaviors (i.e. time constraints).

The physical entity agent that receives the announce message can act according to the following four cases.

Case 1: The work order cannot be processed by the resource or its "child" resources (plant-branches). This is due to unfeasibility in matching the necessary operations and resource capabilities. This case can arise in various scenarios: an error has occurred in setting the scheduling rules for establishing the resource to be contacted; unexpected plant configuration changes have modified the plant-branch production capabilities, etc.

Case 2: All the operations requested by the work order can be processed by one or more plant-branches that are children of the contacted resource and the scheduling criterion aims at containing all the operations of the same work order in one branch only, if possible. For instance, by applying this criterion, if a work order requires two operations, O1 and O2, and there are two identical cells (cell1 and cell2) containing units able to perform O1 and O2, then the work order is entirely processed in either cell1 or cell2; taking apart O1 and O2 of the same work order is not allowed.

Case 3: All the operations requested by the work order can be processed by one or more plant-branches that are children of the contacted resource and the scheduling criterion allows spreading the operations of a work order among different branches, even if it is not strictly necessary. In the example given above, by applying this criterion, a work order can be executed by processing O1 on a unit of cell1 and O2 on a unit of cell2.

Regardless of the plant configuration, the possibility exists of applying different criteria in activating the work order operations. The behaviour depicted above is customizable by way of the Production Modeler (PM) rules in order to implement different scheduling criteria.

Case 4: The operations requested by the work order can be processed by a set of child resources (including the actual resource), yet there is not any sub-branch able to process the whole work order operations set.

The physical entity agent replies to the work order agent with a response message; the contents of the response message differ as a function of the case considered, as shown in the following.

Case 1: the physical entity agent informs the work order agent about the unfeasibility of processing one or more operations of the work order.

Case 2: the physical entity agent delegates the scheduling conversation to one or more child resources. It communicates to the work order agent the list of physical entity agents to contact.

Case 3 or Case 4: the physical entity agent signals the work order agent to activate agents related to its operations and informs it about the physical entity agents that can perform the necessary operations. The message contains the list of work order operation and, for each operation, the list of possible resources that can process the related operation;

Ox:[Ra,Rb],

Oy:[Ra,Rc], etc.

The protocol structure may additionally vary according to the four cases.

Case 1: Conversation abort. No further computation is possible. The work order agent will escalate to other scheduler component.

Case 2: The work order agent activates a new first section for each physical entity agent listed in the response message. Possibly, the work order agent uses a dedicated behavior for managing each section instance by activating behavior instances in a number equal to the number of the physical entity agents it has to deal with. This architecture allows easy implementation of the nested protocol sections/behaviors and provides tracking of the agent actions for free.

The next step of the section is executed after all the nested sections have been concluded, hence all the work order agent behaviours have returned.

Case 3 and Case 4: The work order agent activates the second section of the protocol. The next first section step is executed after the second section has been completed.

Step 2:

When the first section is executing Step 2, the work order agent has received a list of possible complete schedules for the related work order. The computed schedules are the result of either i) execution of nested first section conversations or ii) a second section conversation. Of course, the first section can be nested more than once; eventually, every first section returns to its caller by executing a case 1 or activating section 2 in case 3 or case 4.

The work order agent marks the received whole work order schedules with its own preferences. Then, it sends an evaluate_schedule message to the physical entity agent. The evaluate_schedule message contains the schedule proposals and the related preference values.

Again, this behavior is customizable by way of the Production Modeler (PM) scheduling rules.

The physical entity agent selects a sub-set of possible schedules to save. In fact, this step of the protocol can be repeated if the conversation was delegated more than once, and the physical entity agent can save more than one possible schedule. The final decision, i.e. selecting one schedule only, is expected to be taken by the first physical entity agent that was contacted by the work order agent. However, the scheduling conversation can return more than one possible schedules if the scheduling process is designed to provide user or other software systems with alternative schedules. The physical entity agent replies to the work order agent by providing a list of selected schedules.

This behavior is once more customizable by way of the Production Modeler (PM) scheduling rules.

The work order agent forwards this information to the operation agents related to its work order operations by sending a confirm_schedule message.

Each operation agent informs the physical entity agents that made the slot proposals about the slot to confirm and the slots to be canceled. Each operation agent involved sends a confirm_slot message containing the list of slots to be saved.

The physical entity agent acknowledges the slot confirmation/cancellation by a reply message.

The operation agent replies to the work order agent by indicating that slot confirmation was concluded.

The next step in the protocol is the finishing conversation.

Figure 9:
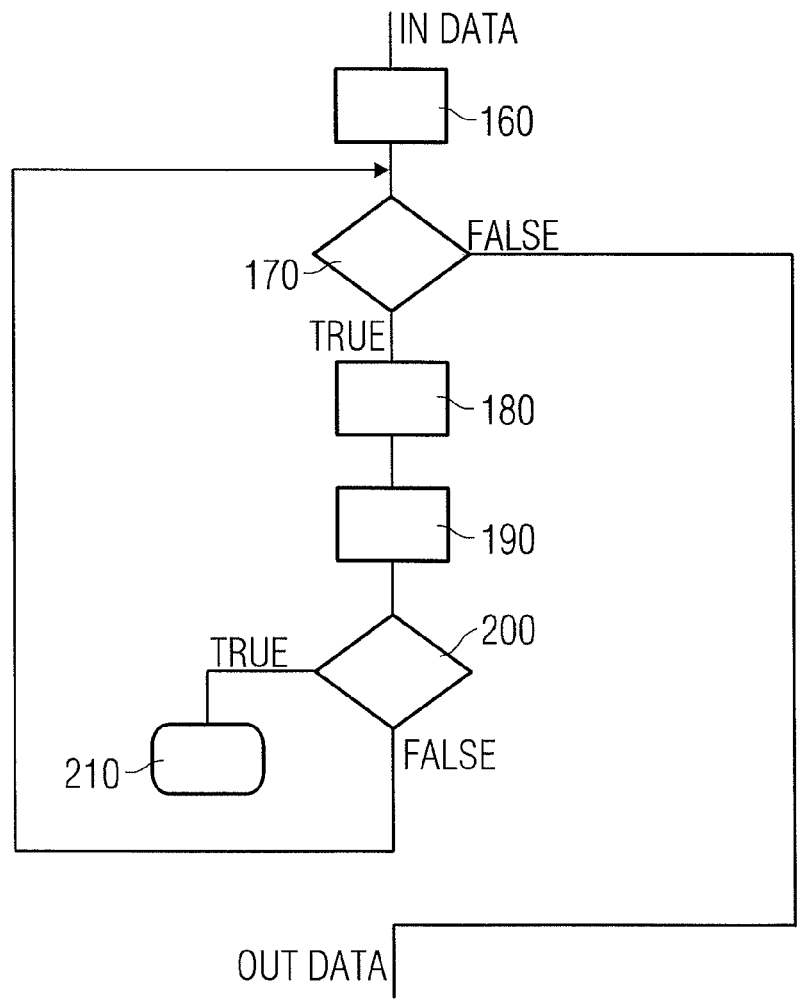
FIG. 9 shows a flowchart for a second section in the protocol described herein.

Second Section "Scheduling Operations":

In FIG. 9, Section 2 of the work order scheduling protocol is presented by way of a flow diagram; it includes evaluation steps, sub-routine call steps and conditional statements.

Referring to FIG. 9, in a step 160 a work order agent activates the operation agents OAs by sending an activate_operation message. The activate_operation message contains the list of physical entity agents that can be contacted by the operation agent for acquiring service. In a step 170 a check is made as to whether operations exist to be scheduled. In the positive, the check operation dependencies are effected in a step 180. In a step 190 a release_operation message is sent to all those operations that can be scheduled and a reply is waited for.

In a step 200 a check is made as to whether any unfeasibilities have been raised. In the positive, in a step 210 an error handling message is sent, thus making a conversation abort possible. In the negative the process returns to the step 170.

The work order agent has to activate its related operation agents and cause them to negotiate for acquiring the necessary resources.

The work order agent has two options for activating the other agents; the former option implements backward scheduling, the latter is a forward scheduling approach.

Backward activation is suitable for strict due-date target criteria. The work order agent activates the sub-tasks starting from the last operation (i.e. the one that has to be completed on the due-date) and proceeding according to the operation reverse order (i.e. in backward order). This arrangement permits gaps to be inserted for reliability of the schedule and for recovering from ready time infeasibility. Forward activation is more suitable for scheduling in highly congested time periods. When applying forward activation, the due-date target is not strongly considered; however there is no time wasted as the jobs are scheduled as soon as possible.

Agent activation is performed by the work order agent according to the operations original order (forward). Forward activation can be further improved by optimizing the selection of time slots and trying to recover from tardy process completion.

Other policies for activating operations are however possible. Each work order agent can implement its own strategies for activating the operations in order to best suit its objective.

A work order agent can apply a scheduling protocol more than once; this happens when a scheduling attempt fails because of unfeasibility in assigning one or more operations to resources. For example, an attempt to satisfy a min-max waiting time for an operation can result in receiving no proposals from the physical entity agents (this case is further detailed in the following).

In this case, the scheduling protocol aborts and the work order agent will attempt again to acquire a schedule for its work order, possibly modifying preferred starting time (or ending time, if backward activation is applied) for the first (last) operations. The work order agent can track the attempts of scheduling and detect any critical scheduling path; if these capabilities are implemented, the work order agent can apply any sequence in releasing operation agents without breaching the protocol.

Once more, the behavior depicted above is customizable by way of the Production Modeler (PM) scheduling rules.

Each operation agent announces itself to all the physical entity agents that were listed in activate_operation message and hence can be contacted for acquiring service. Operation Agents thus send announce messages and physical entity agents reply to the operation agents with acknowledge messages. Then operation agents reply to the work order agents with acknowledge messages.

This protocol phase leads all the physical entity agents to become knowledgeable of the operations that will be released later. In fact, the physical entity agents need to know the operations that will request schedule in order to optimize the way of resolving conflicts in accessing resources. Resolution of conflicts in accessing resources will be described in greater detail in the following.

Work order agents check dependencies and constraints of operations. Specifically, each work order agent detects the operations that can be scheduled and sends a release_operation message to the related operation agent. The release_operation message contains information about release time, due date and deadline for the operation schedule.

Each operation agent that receives the release_operation message sends a request_slot message to all the physical entity agents listed in the activate_operation message it has received. The request_slot message contains data necessary for allocating the best slot for the operation (release time, due date, preferred starting time, etc.).

Physical entity agents receive request_slot messages, and compute one or more slots for the operation. This computation can include several steps, such as sorting the received requests according to custom criteria, evaluating alternatives also considering operations announced, but not requesting a slot. The physical entity agents reply to the operation agent with the list of proposed slots for service.

Whenever a physical entity agent computes a slot for an operation, it may have to deal with and manage conflicts that can arise because of the requests for service emitted by other work order agents. Actually, several scheduling protocol instances can run simultaneously; a physical entity agent can manage more than one conversation at a time and hence they can receive slot requests from more than one operation agent. Each physical entity agent can implement its own behavior for calculating time slots and serving requests. Thanks to the announce protocol phase, the physical entity agent involved is aware of all the operations that are going to request a slot.

In order to improve performance, the physical entity agent can wait until other operation agents have been released before replying to a request and computing slots on the basis of a consolidate view.

The slot selection behavior is another behavior that is customizable by way of the Production Modeler (PM) scheduling rules.

The operation agent receives the proposed slots and marks them with a value indicating preferences. Then it replies to the work order agent by forwarding the list of proposed slots for service with the preferences.

The previous step could in fact fail in computing a slot for operation process. This is due to possible unfeasibility in satisfying constraints as minimum and maximum waiting time.

In this case, the operation agent signals the occurrence of an error to the work order agent, and the work order agent aborts the scheduling conversation. Possibly, this will perform a new scheduling attempt with different parameters or will escalate error to another scheduler component.

The work order agent evaluates partial schedules obtained by combining the received slots for service for each operation. It marks each partial schedule with a value indicating preferences and requests the physical entity agent to select a subset of possible partial schedules to save. It sends a evaluate_partial_schedule message to the physical entity agents. The evaluate_partial_schedule message contains the list of partial schedules with preferences.

The one just described is still another behavior that is customizable by way of the Production Modeler (PM) scheduling rules.

The physical entity agent selects a sub-set of partial schedules to save and replies to the work order agent communicating the selected slots.

The work order agent communicates to the operation agents the list of schedules to be confirmed and hence the list of schedules to be canceled. The work order agent sends a confirm_partial_schedule message to the operation agents The operation agents send a confirm_slot message to the physical entity agents from which they have received one or more proposal.

The physical entity agent acknowledges the slot confirmation/cancellation by a reply message. The operation agent replies to the work order agent informing that the slot confirmation has concluded.

The work order agent can now compute new dependency constraints and release any other operations to be scheduled. The work order agent can release one operation more than once, having regard to the number of possible partial schedule combinations saved by the physical entity agents. For each operation to release and for each partial schedule combination, the work order agent sends a release_operation message to the operation agent.

This protocol part is repeated until all operations are scheduled.

All the operation agents have then been released and have returned a slot confirmation acknowledgement; the second section protocol can thus return the computed schedules to its caller, i.e. a first section protocol instance.

At this protocol step the work order agent has received one or more confirmed whole work order schedule. Finally, the work order agent reports the obtained schedules to the scheduler. The conversation is finished.

Two specific examples of work order scheduling protocol instances will now be described in detail.

The former example is based on a simple plant structure and considers a work order composed of one operation only. This example aims at demonstrating in greater detail the first section of the protocol (the delegation mechanism applied when a request for service has to be propagated to sub-level physical entities). This phase is designed according to a recursive pattern, and providing a practical example is more immediate than providing a formal specification.

On the other hand, the latter example refers to a more articulated scenario with a multiple branch plant structure and a work order composed of many operations, with dependencies. The latter example includes all the possible actions of the protocol and shows a complete work order scheduling conversation in a consolidated view.

A simple work order scheduling protocol instance is described. The example is useful in clarifying the basic structure of the protocol. Both the first section and the second section of the protocol are applied in the example; more to the point, the first section is applied twice due to the particular plant structure that requires delegation of the work order scheduling process.

Figure 10:
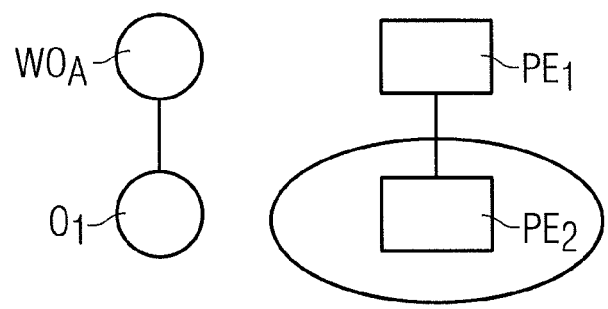
FIG. 10 shows an example of hierarchical structure in an arrangement as described herein.

The plant considered in the examples will be assumed to be comprised of two physical entities organized in the hierarchy structure depicted in FIG. 10, where $PE_1$ is a container entity that contains $PE_2$.

The protocol is not dependent on the specific physical entity (area, cell, etc.), and, for the sake of simplicity of illustration, the plant model used in this example can be assumed to be comprised of a cell (PE1) containing a unit (PE2).

The work order structure (i.e. its related product segment) is depicted in FIG. 10 as well. The order WOA requires one operation only $O_1$, which operation $O_1$ can be processed by $PE_2$ only.

Figure 11:
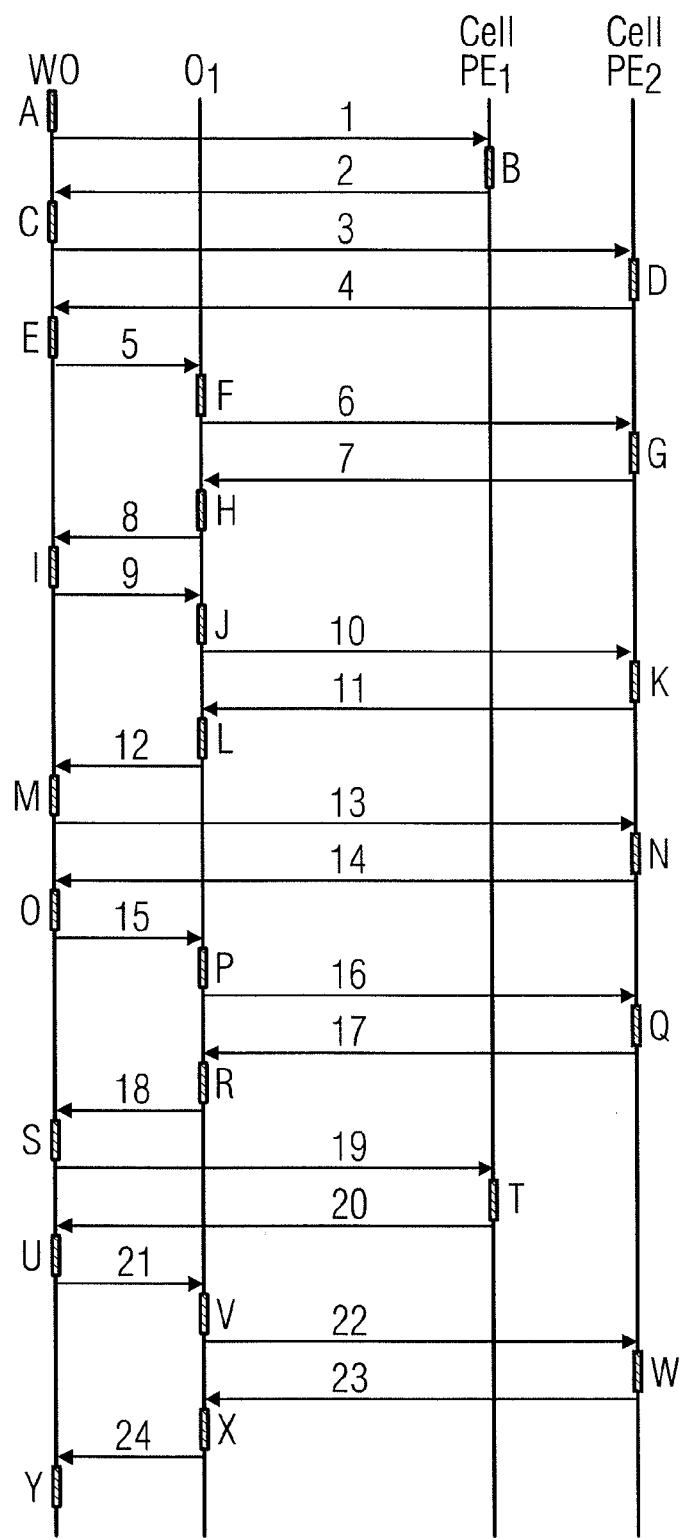
FIG. 11 shows an example useful to clarify the basic structure of the protocol by way of interactions among agents.

The numbers of the sections described in the following correspond to those reproduced in FIG. 11.

1. $WO_A$ decides to send a request for service; the WO requests service to PE1 by sending a request_wo_service message and specifying
   product segment,
   quantity,
   due-date or release-date.

2. PE1 cross-checks the requested functions and its own function capability. The whole WO process can be performed in PE2 (Case 2) so that PE1 replies to the WO specifying the list of PEs to contact PE2.

3. The WO contacts PE2 by sending a new request_wo_service message and specifying
   product segment,
   quantity and
   due-date or release-date.

4. PE2 recognizes it can process the operation requested by the WO (Case 4). PE2 replies to the WO specifying
   that the operations can be activated and
   the equipment to be contacted by each operation (PE2 for O1).

5. The WO activates its child operation agent and causes it to announce itself by sending a activate_operation message.

6. O1 sends a announce message to PE2.

7. PE2 replies to OA with an acknowledge message.

8. OA in turn replies to WOA with an acknowledge message.

9. The WO determines what operations have to be activated according to the dependency scheme and activation policy. In the case considered, only O1 can be activated. WOA signals O1 by sending a release_operation and causes it to contact PE2. The WO communicates to O1 the following data:
   PE to contact and
   due-date or release-date.

10. O1 requests service from PE2 by specifying:
    their functions and
    their due-date or release-date.

11. PE2 computes one or more service proposals and replies to PE2 by specifying the offered time-slot, cost and setups.

12. O1 marks the received service proposals with "preferences" and forwards the offers to the WO by specifying:
    offer schedule data and
    preferences.

13. The WO analyzes possible combinations of the received proposals and marks them with "preferences". WO communicates the possible temporary partial schedules to the PE2 by sending evaluate_schedule message specifying:
    temporary schedule data and
    preferences 14. PE2 selects a sub-set of received service proposal to save and communicates to the WO the sub-set of proposal to be saved.

15. The WO communicates to O1 the selected schedule by sending a confirm_schedule message, by specifying the list of proposals to be saved.

16. O1 signals PE2 to save the selected proposal and discard the others sending a confirm_slot message containing the list of proposals to be saved.

17. PE2 acknowledges O1 with the saved proposals (this may include a possible error report, which is not detailed in this protocol description).

18. O1 acknowledges the WO with the saved proposals.

19. The WO analyzes the received proposals (only one in this example) and marks them with "preferences". The WO communicates the possible temporary partial schedules to the PE1 (evaluate_schedule message) by specifying:
    temporary schedule data and
    preferences.

20. PE1 selects one of the received service proposal to save and communicate to the WO the proposal to be saved.

21. The WO communicates to its operation (O1) the selected schedule, by specifying the schedule (confirm_schedule message).

22. O1 signals PE2 the selected schedule to be confirmed specifying (confirm_slot message) the schedule to be confirmed.

23. PE2 acknowledges O1 with the confirmed schedule (this may include a possible error report, not detailed in this description).

24. O1 acknowledges the WO with the confirmed schedule.

A complete negotiation protocol among a work order agent and physical entity agents will now be described in connection with FIGS. 12 and 13.

The protocol description is given with reference to a scheduling problem that includes all the possible options for the generic work order and plant configurations.

Figure 12:
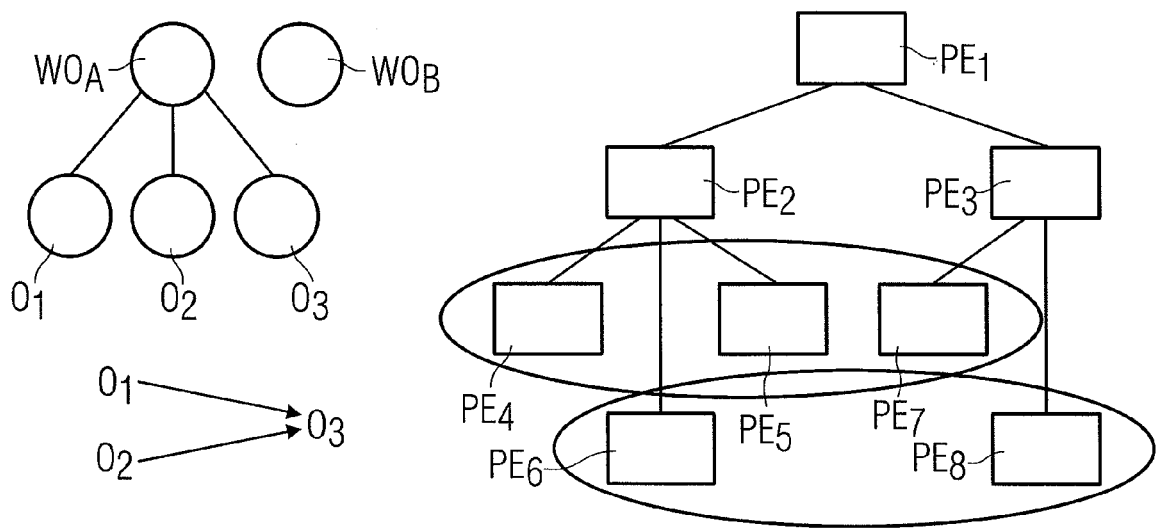
FIG. 12 shows an example of hierarchical system.

The example considers work orders of the type WOA depicted in FIG. 12.

The protocol description is detailed for one work order instance only. However, other work order instances can apply their own work order scheduling conversation simultaneously. work orders of other types (e.g. $WO_B$) could be active as well.

As indicated, the plant considered is assumed to be comprised of a set of physical entities organized in a tree-like hierarchy structure including branches. This plant structure is compliant with the ISA 95 standard, while the types of physical entities in the problem instance are not specified in order to emphasize the general nature of the protocol description. While every physical entity agent involved in the negotiation protocol plays essentially the same role (physical entity), the physical entity agents behave differently, according to the level of the related entity in the hierarchy structure. Those agents (PEs) that are container of other PEs (area, cell) delegate the negotiation process to sub-level agents; the PEs in the lowest level have to compute and offer a service for the operation.

In the problem instance depicted in FIG. 12, WOA requires three operations: $O_1$, $O_2$ and $O_3$. $O_1$ and $O_2$ require the function type A, $O_3$ requires the function B. $O_3$ has to be performed after $O_1$ and $O_2$ completion.

While the plant description is given in terms of general physical entities, an exemplary specific denotation for each entity may be beneficial in appreciating the problem instance. The plant is composed of a $PE_1$ (area) containing two PEs, $PE_2$ and $PE_3$ (cells). $PE_2$ in turn contains three PEs: $PE_4$, $PE_5$ and $PE_6$ (units), while $PE_3$ contains two PEs: $PE_7$, $PE_5$ and $PE_8$ (units).

The units $PE_4$, $PE_5$ and $PE_7$ are equivalent and can perform function type A. $PE_6$ and $PE_8$ are equivalent and can perform function type B. Hence, the two cells $PE_2$ and $PE_3$ are equivalent as they have the same production capability. Consequently, $WO_A$ can be processed by either $PE_2$ or $PE_3$.

1. The WO decides to send a request for service by sending to PE1 a request_wo_service message and specifying:
   product segment,
   quantity and
   due-date or release-date.

2. PE1 cross-checks the requested functions and its own function capability. The whole WO process can be performed in either PE2 or PE3 (Case 2) so PE1 replies to WO by specifying the list of PEs to contact (PE2, PE3).

3. The WO contacts PE2 and PE3 sending two request_wo_service messages and specifying:
   product segment,
   quantity,
   due-date or release-date.

4. Both PE2 and PE3 recognize the operations requested by the WO have to be processed by sub-level PEs (Case 4). PE2 and PE3 reply to the WO by specifying:
   that the operations to be activated, and
   the equipments to be contacted by each operation (PE2: PE4 and PE5 for both O1 and O2; PE3: PE7 for both O1 and O2).

From this point onwards, the WO activates two similar conversations, with PE2 (and its sub-level equipments) and PE3 (and its sub-level equipments). Only the conversation with PE2 (and its sub-level equipment) is shown in the protocol diagram.

5. The WO activates its child operation agents and causes them to announce themselves by sending a activate_operation message.

6. Each OA sends a announce message to the PEA it will contact for acquiring service.

7. The PEA involved replies to the OA with an acknowledge message.

8. OA in turn replies to the WOA with an acknowledge message.

9. The WO determines what operations have to be activated according to the dependency scheme and activation policy. It signals the operations to be activated (O1 and O2) by sending a release_operation and causes them to contact the right PE. The WO communicates to O1 and O2 the following data:
   PEs to contact and
   due-date or release-date.

10. Both O1 and O2 request service to PE4 and PE5 by specifying:
    their functions and
    their due-date or release-date.

11. PE4 and PE5 compute one or more service proposals and reply to PE2 by specifying the offered time-slot, cost and setups.

12. Both O1 and O2 mark the received service proposals with "preferences" and forward the offers to the WO by specifying:
    offer schedule data and
    preferences.

13. The WO analyzes possible combinations of the received proposals and marks them with "preferences". WO communicates the possible temporary partial schedules to the PE2 by sending evaluate_schedule message by specifying:
    temporary schedule data and
    preferences.

14. PE2 selects a sub-set of received service proposal to save and communicate to the WO the subset of proposals to be saved.

15. The WO communicates to its operations (O1 and O2) the selected schedule by sending a confirm_schedule message, by specifying the list of proposals to be saved.

16. O1 and O2 signal PE4 and PE5 to save the selected proposals and discard the others sending a confirm_slot message containing the list of proposals to be saved.

17. PE4 and PE5 acknowledge O1 and O2 with the saved proposals (this may include a possible error report, not detailed in this description).

18. O1 and O2 acknowledge the WO with the saved proposals. The steps I', M', N', and O' and the messages 9', 12', 13', 14', 15', and 18' are essentially similar to the protocol sections from step I to step O and messages from 9 to 18 described in the foregoing. This protocol section computes the schedule slot for the operation O3. The operation O3 is activated according to the release date and due date of the previous operations. The operation O3 is provided with information about the previous operations reserved schedule. If more than one slot for either O1 or O2 have been reserved, then the WO activates O3 more than one in order to evaluate all the alternatives.

At this point, the WO concludes two similar conversations, with PE2 and PE3, respectively.

19. The WO analyzes possible combinations of the received proposals and marks them with "preferences". WO communicates the possible temporary partial schedules to the PE1 (evaluate_schedule message) by specifying:

temporary schedule data and preferences.

20. PE1 selects one of the received service proposal to save and communicate to the WO the proposal to be saved.

21. The WO communicates to its operations (O1, O2 and O3) the selected schedule, by specifying the schedule (confirm_schedule message).

22. O1, O2 and O3 communicate to the Physical Entities the selected schedule to be confirmed by specifying (confirm_slot message) the schedule to be confirmed.

23. PEs acknowledge O1, O2 and O3 with the confirmed schedule (this may include a possible error report, not detailed in this description).

24. O1, O2 and O3 acknowledge the WO with the confirmed schedule.

Due to the specific behavior of the protocol and the architecture described in the foregoing, the solution described herein leads i.a. to the following advantages in using a scheduling process in manufacturing environment:

portability: the arrangement described herein can be easily applied to any production environment compliant to ISA 95 specifications without requiring specific developments to adapt such a system to manufacturing plants;

distributed scheduling decisions: the scheduling criteria (associated with entities in a manufacturing system) reflect the distributed structure of ISA 95 and the associated agents; specifically the protocol described herein allows distributing the scheduling decisions throughout the manufacturing plant;

local definition of scheduling constraints: technological constraints are taken into account locally by way of the single agent associated to the manufacturing equipment and by agents associated to work orders and operations; and flexibility: any changes in the ISA 95 model of production plant and products is directly catered for by the scheduling system, by effecting corresponding changes in the agent-based architecture; flexibility is a direct consequence of the distribution of the scheduling decisions and of the local definition of the scheduling constraints above mentioned.

The invention claimed is:

1. A scheduling system for planning and scheduling production in an industrial production system, which scheduled production is to be executed by the production system under control of a manufacturing execution system, the scheduling system comprising:
   a multi-agent scheduling system;
   at least a part of a behavior of agents in said multi-agent scheduling system being customizable by visually defined scheduling rules;
   a definition and execution environment, shared by the scheduling system and manufacturing execution system, the definition and execution environment including:
      an editor operable to visually define both said scheduling rules and control rules of the manufacturing execution system, and
      an execution engine for executing said scheduling rules and control rules and making scheduling decisions based on an execution of said scheduling rules and control rules.

2. The scheduling system of claim 1, wherein interaction rules between said agents are established by a scheduling protocol adapted to the production system by at least a part of the customizable agent behavior.

3. The scheduling system of claim 1, wherein a definition of said scheduling and control rules is based on a given set of graphical items.

4. The scheduling system of claim 1, wherein said visually defined scheduling rules are selected from the group consisting of scheduling constraints, scheduling criteria, interactions among scheduling and production control activities.

5. The scheduling system of claim 1, wherein said scheduling rules are visually defined by using an implementation of a visual language including items selected from the group consisting of modules for:
   real time acquisition allowing a definition of rules to detect an occurrence of events;
   output of data to external destinations;
   allowing function calls;
   storing local data within a rule scope;
   conditional statements;
   providing entry points for sub-rules invocation; and
   graphical links connecting modules and defining the rule computation flow.

6. The scheduling system of claim 1, wherein said agents are selected from the group consisting of:
   agents associated with physical assets;
   agents associated with information; agents associated with functions; and
   agents associated with scheduling decision activities.

7. The scheduling system of claim 1, wherein said agents are arranged in classes with different behaviors selected from the group consisting of:
   asking other agents for services or information;
   replying to requests for service; and
   synchronizing with other agents' activity.

8. The scheduling system of claim 1, wherein said agents are arranged in a hierarchy, said hierarchy including entities selected from the group consisting of:
   an agent site,
   a set of agent areas related to said agent site in a decision hierarchy relationship,
   a set of agent cells related to at least one of said agent areas in a decision hierarchy relationship, and
   a set of agent units related to at least one of said agent areas and said agent cells in a decision hierarchy relationship.

9. A work order scheduling protocol for an agent-based scheduling system for scheduling processing of incoming work orders in a plant through operations performed by physical entities available in the plant, wherein agents in said scheduling system comprise a tree-like hierarchy including branches, said protocol ruling interactions between said agents in assigning operations requested by said incoming work orders to said physical entities, said protocol comprising:
   a first main section, wherein the protocol identifies in said hierarchy a plurality of branches, each branch thus identified including physical entities adapted to process a given work order, and
   a second main section, wherein processing of said given work order is scheduled for each one of said identified branches of physical entities, whereby one of said scheduled branches is adapted to be selected for processing said given work order.

10. The protocol of claim 9, wherein said protocol involves agents of said system acting as product segments agents to select a physical entity to contact for starting said negotiation protocol.

11. The protocol of claim 10, wherein said protocol is based on the following rules:

a physical entity to contact is a lowest level entity able to perform all activities listed in related product segments; and if more than one entity at the same level is available, then a parent entity is selected.

12. The protocol of claim 9, wherein said protocol is based on scheduling rules customizable as visual rules.

13. The protocol of claim 9, wherein sections are selected from the group consisting of:

an initialization section, said first main section requesting work order service by activating new instances of the section itself, said second main section including a set of scheduling operations executed iteratively, and a finishing section.

14. The protocol of claim 13, further comprising a work order scheduling conversation by agents acting as work order agents applying said first main section of the protocol.

15. The protocol of claim 13, wherein said first main section involves a first step wherein a work order agent sends to a physical entity agent a request message including information about required operations, and the physical entity agent that receives said request message is configured for acting by indicating any of:

i) the work order being unable to be processed by the respective resource, directly or via any of its child resources;

ii) all the operations requested by said work order being able to be processed by any of said child resources, thus allowing a scheduling criterion aiming at containing all the operations of the same work order in one branch only;

iii) all operations requested by said work order being able to be processed by a set of said child resources, thus allowing a scheduling criterion spreading said operations of said work order over different branches in said system; and iv) the operations requested by said work order being able to be processed by a set including said respective resource and its child resources, while no sub-branch exists in said system able to process the whole set of the operations requested by said work order.

16. The protocol of claim 14, wherein said first main section involves a second step including operations selected out of the sequence wherein:

having received a list of possible complete schedules for a related work order, said work order agent marks the received whole work order schedules with its own preferences and it sends to a physical entity agent a message containing schedule proposals and related preference values;

said physical entity agent selects a sub-set of possible schedules to save and replies to said work order agent by providing a list of selected schedules in the form of proposed slots;

said work order agent forwards this list to a set of operation agents related to its work order operations by sending a confirm message;

each said operation agent informs the physical entity agent that made the slot proposals about the slot to confirm and the slots to be canceled by sending a confirmation message containing the list of slots to be saved;

said physical entity agent acknowledges said slot confirmation/cancellation by a reply message; and said operation agent replies to the work order agent by indicating that slot confirmation was concluded.

17. The protocol of claim 16, wherein said second main section includes said work order agent activating a related operation agent by sending an activation message containing a list of physical entity agents that can be contacted by said related operation agent for acquiring service.

18. The protocol of claim 14, wherein said work order agents are configured for applying a scheduling protocol more than once when a scheduling attempt fails because of unfeasibility in assigning one or more operations to resources.

19. The protocol of claim 17, wherein said second main section includes the operations of:

said operation agents sending announcing messages to announce themselves to the physical entity agents able to be contacted for acquiring service;

said physical entity agents replying to said operation agents with acknowledge messages; and said operation agents replying to said work order agents with acknowledge messages, whereby all said physical entity agents become knowledgeable of the operations that will be released later.

20. The protocol of claim 17, further comprising operations of:

said work order agents checking dependencies and constraints of operations by detecting operations able to be scheduled and sending release messages to the related operation agents, said release messages containing information about release time, due date and deadline for the operation schedule;

each operation agent receiving one said release message sending a request message to the physical entity agents listed in the activation message it has received, said request message containing data for allocating a best slot for the operation;

said physical entity agents receiving said request messages and determining one or more slots for the operation; and said physical entity agents replying to the operation agent with the list of proposed slots for service.

* * * * *